Feb. 21, 1950 M. D. BALLER 2,497,854

ULTRA HIGH FREQUENCY RING OSCILLATOR

Filed Feb. 25, 1943 5 Sheets-Sheet 1

INVENTOR.
MELVIN D. BALLER
BY
William D. Hall.
ATTORNEY.

ULTRA HIGH FREQUENCY RING OSCILLATOR

Filed Feb. 25, 1943 5 Sheets-Sheet 2

*INVENTOR.*
MELVIN D. BALLER
*BY* William D. Hall.
*ATTORNEY.*

ULTRA HIGH FREQUENCY RING OSCILLATOR

Filed Feb. 25, 1943 5 Sheets-Sheet 3

INVENTOR
MELVIN D. BALLER
BY
William D. Hall
ATTORNEY

Feb. 21, 1950 M. D. BALLER 2,497,854

ULTRA HIGH FREQUENCY RING OSCILLATOR

Filed Feb. 25, 1943 5 Sheets-Sheet 4

INVENTOR
MELVIN D. BALLER

BY William D. Hall
ATTORNEY

Feb. 21, 1950 M. D. BALLER 2,497,854

ULTRA HIGH FREQUENCY RING OSCILLATOR

Filed Feb. 25, 1943 5 Sheets-Sheet 5

INVENTOR
MELVIN D. BALLER
BY William D. Hall
ATTORNEY

Patented Feb. 21, 1950

2,497,854

UNITED STATES PATENT OFFICE 2,497,854

ULTRA HIGH FREQUENCY RING OSCILLATOR

Melvin D. Baller, Little Silver, N. J., assignor to the United States of America as represented by the Secretary of War Application February 25, 1943, Serial No. 477,103

13 Claims. (Cl. 250—36)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to transmission networks, and particularly to networks which are suitable for use with electron tubes in the transmission, generation, or amplification of ultra high frequency radio waves.

The problem of generation or amplification of high power ultra short waves of the order of five meters, or less, involves at least two conflicting factors. On the one hand, ultra short waves demand that the tube capacities be small. On the other hand, high powers involve the use of large tube electrodes with concomitant increase in the interelectrode capacities.

Certain circuits have been devised heretofore which use a plurality of low power tubes so interconnected that the resultant power output is proportional to the number of tubes. However, difficulty has been experienced in maintaining proper phase relationship between the various tubes and associated circuits and in providing an effective method of coupling said circuits to a common external circuit. The load is therefore not evenly distributed among all the tubes with resultant loss in power output and the generation of spurious frequencies.

It is therefore an object of the present invention to provide circuits for interconnecting a plurality of small low power tubes in such manner that each tube provides a substantially equal share of the power and wherein all tubes are properly connected to a common output circuit so that they are equally loaded thereby. Toward the accomplishment of this object, a plurality of individually tuned push-pull circuits are interconnected by means of resonant networks in such manner that the current in each circuit equally affects and is equally affected by the currents in all the other circuits. The resonant networks are physically arranged to form a ring, whereby they can be easily coupled to a common input or output coil.

It is a further object of the invention to provide novel resonant line arrays for such push-pull tube circuits and to so arrange them that they can be connected to said tubes and to tube electrode potential sources with a minimum length of interconnecting leads, thus reducing losses and permitting the use of smaller circuit components necessary for generating shorter waves.

It is a further object of the invention to provide a novel transmission line array for the above-mentioned circuits in which a plurality of groups of resonant lines are positioned in a minimum of space. This is accomplished by providing a plurality of groups of resonant lines, one group being nested within the space bounded by the other group, and also by staggering the lines of one group with respect to the lines of the other groups.

For a better understanding of the invention, together with other and further objects thereof, reference is made to the following description, taken in connection with the accompanying drawings, and its scope will be pointed out in the following claims. Like reference numerals in the several figures of the drawing refer to like parts.

Figure 1:
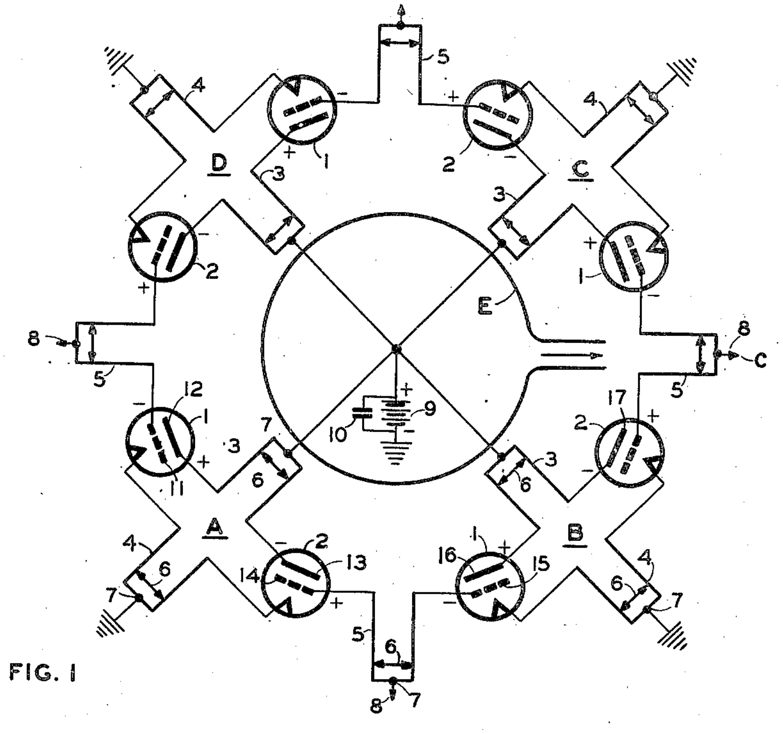
Figures 1 through 10 are schematic circuits showing different embodiments of the invention.

Referring now more particularly to Fig. 1 of the drawings, there are shown four circuits A, B, C, and D, each of which includes a pair of triodes 1 and 2. Like elements of each pair, in this case the anodes and cathodes, are connected to opposite ends of balanced lecher lines 3 and 4. The remaining like elements of each pair, in this case the grids, are respectively connected to a grid in an adjacent pair of triodes through balanced lecher lines 5. All lecher lines may be tuned by means of adjustable shorting bars 6.

Since the lecher lines are balanced, their electrical midpoints 7, which in this case are also their structural midpoints, are at ground potential for radio frequencies. Points 7 are therefore suitable for the application of exciting potentials to the tube electrodes. Thus the midpoints of all cathode lechers 4 are directly connected to ground; and a grid bias potential source (not shown) may be connected to the midpoints of grid lechers 5 through leads 8; and the midpoints of all the anode lechers 3 are connected to the positive pole of an anode voltage source 9. The other poles of the grid and plate potential sources are grounded. A radio frequency bypass condenser 10 may be used to shunt the anode voltage source 9 and a similar bypass may be provided for the grid potential source. These bypass condensers may be dispensed with if the circuits are perfectly balanced.

It will be seen that the above described circuit is both physically and electrically arranged in ring fashion and therefore permits compact physical arrangement of the components and minimum length of interconnecting leads; characteristics which are extremely important for ultra-high frequencies.

In order that the tubes function as oscillators it is necessary that one of their electrodes be at some reference potential, such as ground, and the potentials of the other electrodes vary with respect to said reference potential but in opposite phase. In the circuit above described, the cathode lechers 4 are so adjusted that each is electrically about a half wave length long, or a multiple of a half wave length, at the frequency at which the oscillator operates. This keeps all the cathodes at ground potential for R. F. currents. However, cathode tuning may be dispensed with with certain types of tubes. To keep the grids and plates 180 degrees out of phase, anode lechers 3 and grid lechers 5 are so adjusted that they are electrically about a quarter wavelength long, or an odd multiple of a quarter wave length. With an even number of tubes, these dimensions also assure proper phase relations on the electrodes of all tubes to maintain them locked in synchronism.

Instead of using half wave lechers to maintain the cathodes at the same reference potential, i. e. at ground potential, it is likewise possible to use half wave lechers in the grid or plate circuits and use quarter wave lechers to interconnect the other electrodes.

Referring now to the operation of the circuit in Fig. 1, assume grid 11 of tube 1 in circuit A to be negative. Anode 12 is therefore positive, since the grid and anode potentials are 180° out of phase. Anode 13 is negative since it is at the opposite end of a balanced quarter wave lecher line. Continuing on thru the system it is seen that grid 14 is positive, grid 15 is negative, anode 16 is positive, and so on until it will be seen that grid 11 is negative, which checks with the original assumption of the polarity of grid 11.

It will also be seen that the phase relations are such that each pair of tubes in circuits A through D are in push-pull. Each tube of one pair is also in push-pull relation with the adjacent tube of the next pair.

Feedback for maintaining oscillation is derived through the interelectrode capacities in the tubes or by coupling between the lecher lines or a combination of both.

A particular feature of this invention is in the method of coupling this circuit to an external circuit. It will be noted that the currents in all the adjustable shorting bars 6 of the anode lechers are in phase. A pickup coil E is therefore arranged in inductive relation to these shorting bars. Hence the total power induced in coil E is equal to the sum of the power outputs of all the tubes. Thus the circuit is in effect a plurality of tuned push-pull circuits all locked in phase and all feeding into a common output circuit. Coil E forms part of a tuned transmission line which may be connected to an antenna or other form of load circuit. The pickup coil can also be coupled to the grid or cathode lechers, as well as to the anode lechers, or to any combination of them.

An advantage of the above described arrangement of tubes and circuit components is the fact that the system is physically and electrically symmetrical. Hence all tubes are affected identically and the total load is divided equally among the tubes; thus avoiding overloading of some of the tubes and underloading of others, so that maximum power output is derived.

This method of interconnecting a number of tubes can be extended to any even number of tubes. Four pairs have been shown in Fig. 1, but a smaller or greater number of pairs can be interconnected in the same manner. An odd number of tubes can also be used if an additional phase shift of 180° is provided in at least one of the circuits to assure proper phase relation to maintain oscillation.

Figure 2:
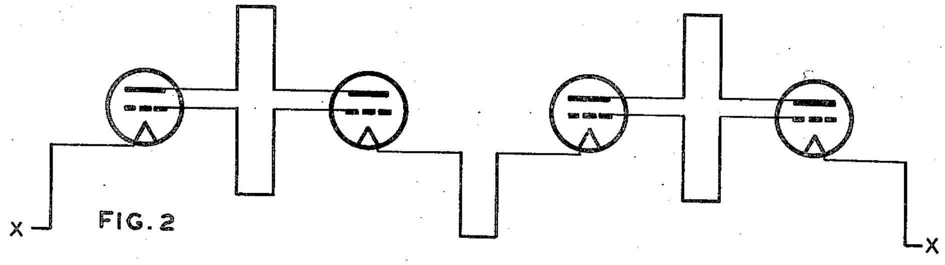
Figure 3:
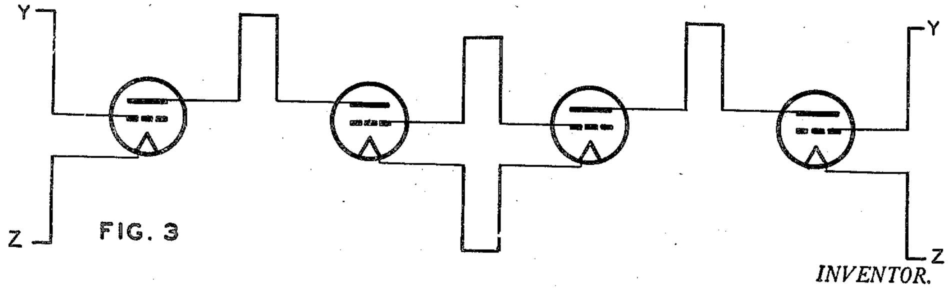

In Fig. 1 the grids are used to interconnect and synchronize each pair of tubes in circuits A—D with the adjacent pairs. But the cathodes or anodes can also be used for interconnection as shown in Figs. 2 and 3 respectively. In these figures only four tubes are shown and, if this is the total number, points X—X in Fig. 1, and points Y—Y and Z—Z in Fig. 2 will be connected together. Additional pairs can be added on either side.

Figure 4:
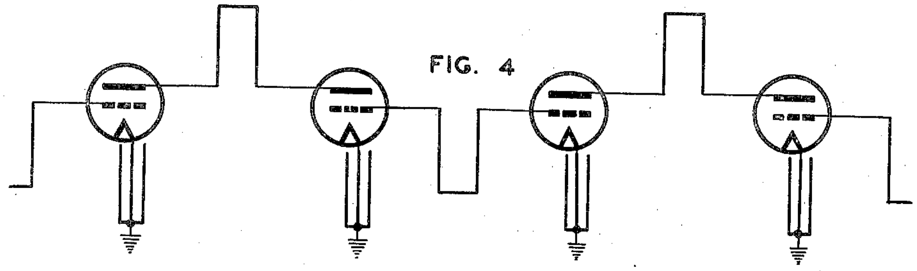
Figure 5:
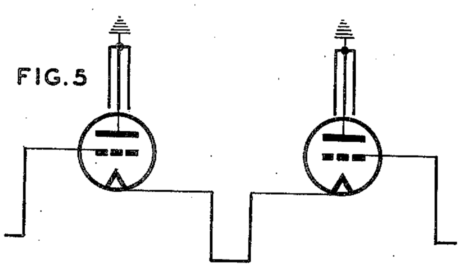
Figure 6:
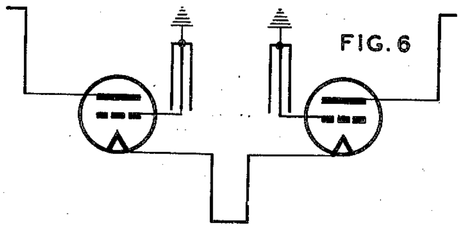

Instead of using balanced lecher lines, pairs of single ended lines, e. g. concentric transmission lines grounded at one end, can be used to interconnect the cathodes, anodes, or grids as shown in Figs. 4, 5 and 6 respectively. These figures show only one lecher line replaced by two transmission lines but the same substitution can be made for all lecher lines. Tuned circuits using lumped capacity, inductance, and resistance or combinations of lumped and distributed constants can also be used if the frequency requirements permit it.

Figure 7:
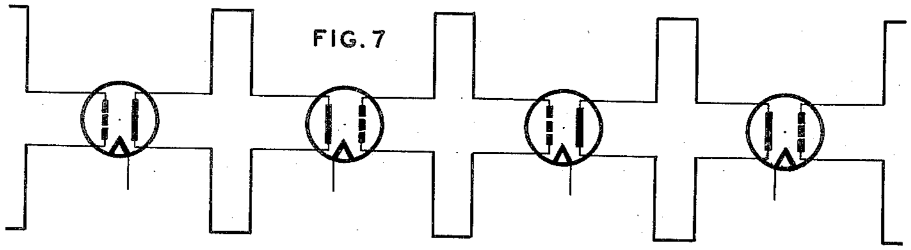
Figure 8:
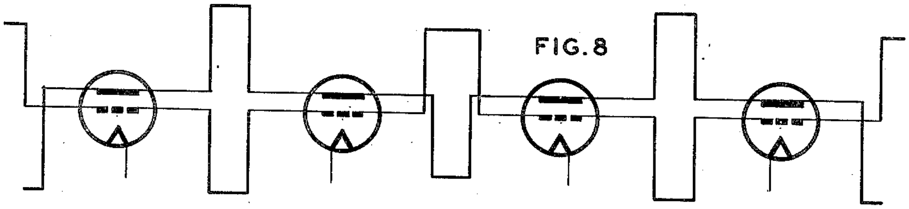
Figure 9:
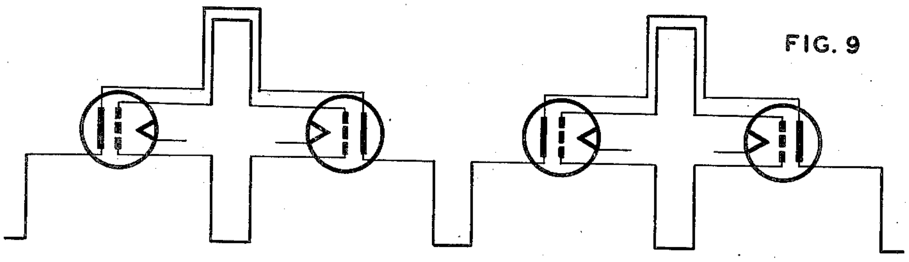

A greater degree of flexibility can be obtained with the use of "double-ended" tubes, i. e. tubes which have two terminals extending from opposite sides of the grids and plates, since it permits increasing the number of circuits that interconnect the various electrodes. Thus Figs. 7–9 show double the number of resonating circuits interconnecting the plates and grids, the cathode tuning lines being omitted for clarity. Figs. 8 and 9 differ from Fig. 7 merely in the disposition of the various lecher lines. In Fig. 8 the grid and plate lines are interlaced. In Fig. 9 the grid lines are doubled back on themselves, as in Fig. 7, and the plate lines are interlaced with the grid lines. Various other ways of positioning the various elements are obviously possible. In Figs. 7–9, cathode tuning means (not shown) may also be used. In Figs. 4–9, electrode potentials are applied in a manner described in connection with Fig. 1.

In all of the circuits described, tetrodes, pentodes or other types of multi-element tubes may be used instead of triodes. Either the directly heated or indirectly heated type of cathode may be used.

Figure 10:
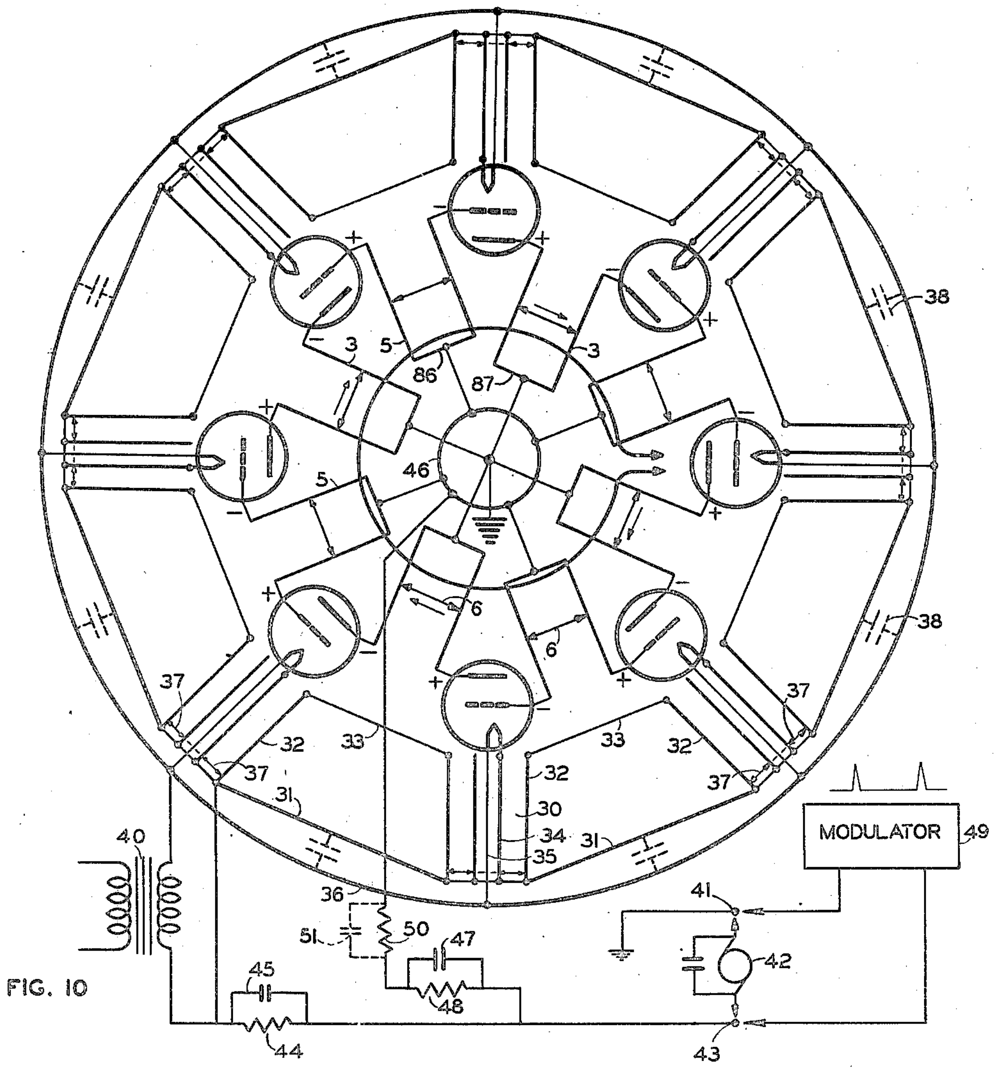
Figure 11:
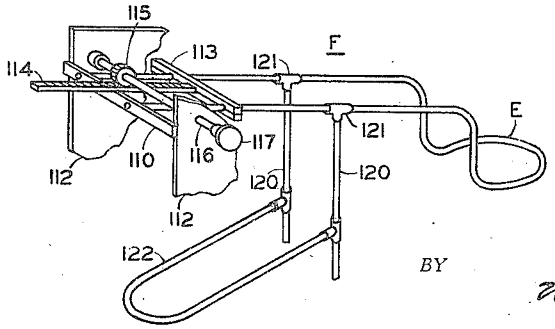
Figure 11 is a perspective view of one detail of my invention.
Figure 12:
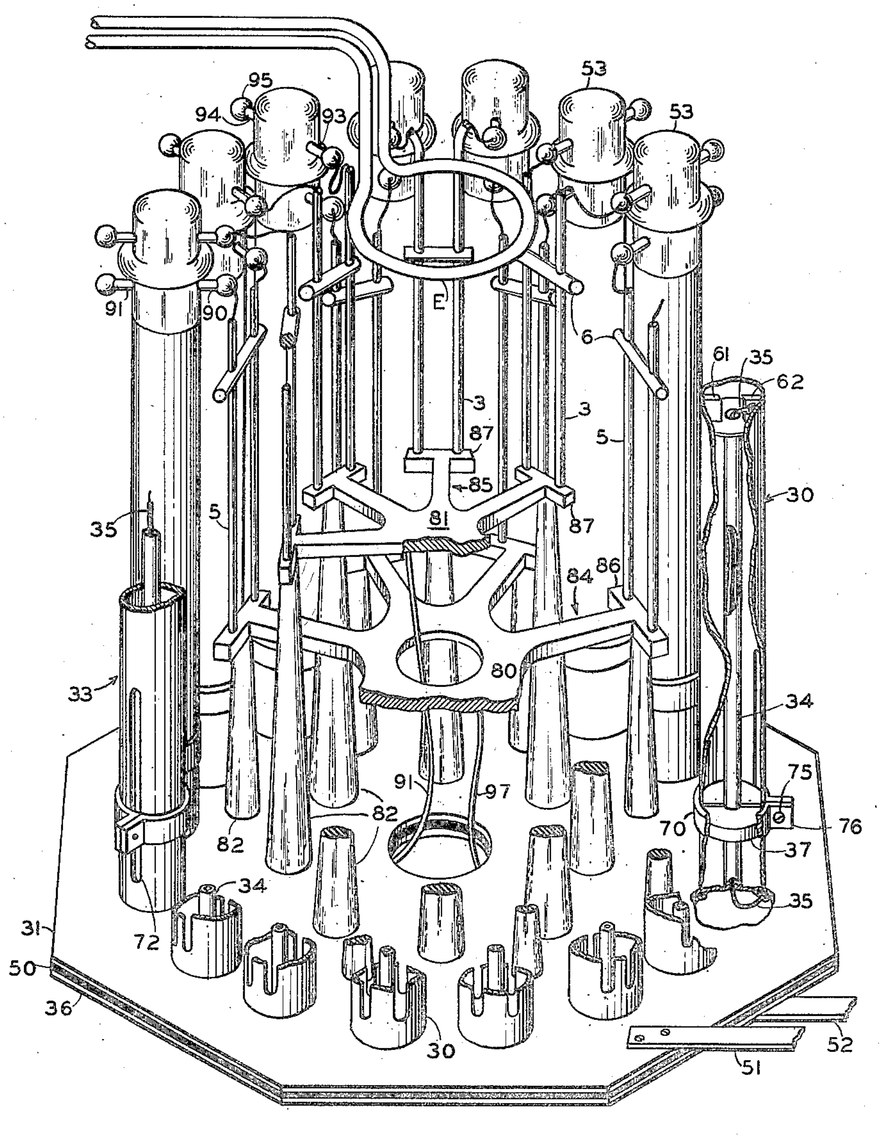
Figure 12 is a perspective view of my invention with parts removed.
Figure 13:
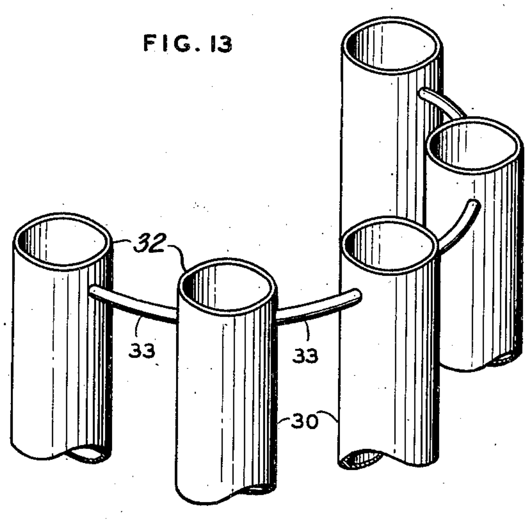
Figure 13 is a perspective view of another detail of my invention.
Figure 14:
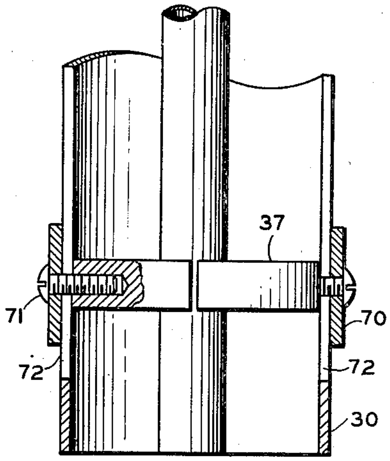
Figures 14 and 15 are sectional views of still other details of my invention.
Figure 15:
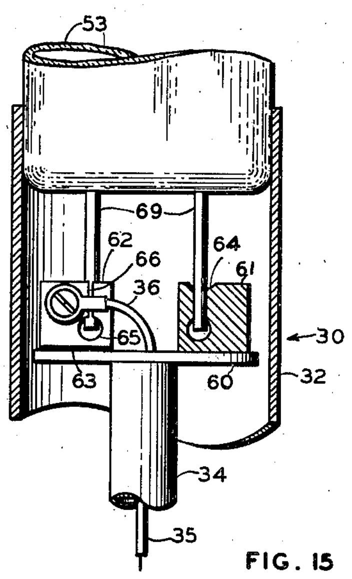

Figs. 10 through 15 illustrate the circuits and structure of another embodiment of my invention. The circuit in Fig. 10 is similar to that of Fig. 1, but modified as suggested in Fig. 4. The grids and plates are tuned by balanced quarter wave lecher lines 3 and 5, and the filaments are tuned by half wave concentric transmission lines 30, connected at one end to filament bus 31 which is at R. F. ground potential. As shown more particularly in Fig. 13, the hollow outer conductors 32 are also connected together at or near their upper ends by stiff bus wires 33, since these are equipotential points. This latter connection is not actually necessary but it adds to the mechanical rigidity of the structure and increases the efficiency and electrical stability of the circuit. Referring more particularly to Figs. 12 and 15, the inner conductors 34 are also hollow, and serve to connect one filament terminal of the tubes to filament bus 31. Insulated wires 35, extending through the hollow inner conductors, connect the other filament terminals to the filament bus 36.

Slidable shorting disks 37 provide for accurate adjustment of the effective wavelength of the concentric transmission lines.

Filament current is supplied to busses 31 and 36 from the secondary of transformer 40. The anode lechers 3 are connected at their centers directly to ground so that they are excited by the grounded terminal 41, to which the positive pole of an anode potential source 42 may be connected. Filament bus 31 is connected to the negative terminal 43 of the anode source through a resistor 44, shunted by a condenser 45, to provide cathode bias as a function of the average anode current. The grid lechers 5 are connected to the grid bus 46 which is in turn connected to the negative terminal 43 in series with a grid condenser 47, shunted by grid leak 48, to provide an additional bias in response to the average grid current. An unbypassed resistor 50 is also inserted in the grid lead to provide a protective bias upon the initial application of a pulse modulation, referred to below. The biasing networks provide protection against excessive plate and grid currents.

It will be noted that this circuit differs from that in Fig. 1 mainly in the use of a plate potential source with a grounded positive pole, which permits direct connection to ground of the anode circuits but requires that the filament be insulated against high voltages. This feature is provided to adapt the oscillator for use with a special plate modulator 49, described and claimed in the application of John W. Marchetti, Serial No. 477,482 filed March 3, 1943 and now matured into Patent No. 2,400,619. The modulator is adapted to be connected to terminals 41 and 43 in place of anode power source 42 and provides very short sharp pulses of high voltage and high peak power for modulating the plate circuit of the oscillator.

Because said pulses are of very short duration and the intervals between pulses are long relative to the pulse duration, the resistance-condenser networks 44—45 and 47—48 must have a relatively long time constant. The reactance of condensers 45 and 47 must, however, be low for the pulse frequency and for any residual R. F. currents. Since the oscillator is inoperative until a pulse of voltage is applied to the plate, there is normally no bias voltage developed across biasing networks 44—45 and 47—48. As a result there are liable to be unduly large plate current surges developed when the modulating network is first connected to the plates. To avoid such surges, unbypassed resistor 50 is used to develop a protective bias until voltage builds up across the aforementioned biasing networks. An unbypassed resistor can also be placed in the cathode biasing circuit or in both grid and cathode circuits.

Even after the voltage across biasing networks 44—45 and 47—48 builds up, unbypassed resistor 50 has the important function of permitting the start of oscillations considerably before each pulse reaches its maximum potential. Due to distributed and stray capacity 51 existing across resistor

50, it has a very small time constant so that a very slight delay occurs in the voltage built up across said resistor after the beginning of each pulse. As a result grid current builds up more rapidly at the beginning of each pulse so that the oscillator can start oscillating early in the pulse cycle. The amount of this stray capacity must be sufficient to bypass the residual R. F. currents but offer very high impedance to all the pulse frequency components except possibly the higher orders. The stray inductance of resistors 44, 48, and 50 must be kept at a minimum.

For use with a sixteen tube transmitter the components used in the biasing networks have the following values: Resistor 44 is 900 ohms, resistor 48 is 25,000 ohms, resistor 50 is 250 ohms, capacity 45 is two microfarads, and capacity 8 is one microfarad. For some conditions of operation biasing network 47—48 is shorted out.

It should be understood that the above biasing networks are of special importance in connection with pulse modulation. Some or all of these networks can be omitted if operating conditions permit. These biasing networks are not per se a part of my invention. For a more detailed treatment of these networks reference is made to the copending application of John J. Slattery, Serial No. 497,453, filed August 5, 1943, wherein they are described and claimed.

Referring now to Fig. 12, the base plate is composed of two superposed metal plates 31 and 36 separated by an insulating plate 50. Plates 31 and 36 form the filament power busses, the filament source being connected to lugs 51 and 52 secured to said plates. The capacity between the plates, indicated, in dotted lines in Fig. 10, as capacities 38, keeps both sides of the filaments at the same potential for radio frequency currents. Instead of an insulating plate, an air space can also be used as a dielectric.

Circumferentially spaced near the edge of the base, in an upright position, are the filament lines 30 with both inner outer conductors fastened directly to base plate 31. Insulated filament leads 35 pass through apertures in both plates and are soldered to the bottom of lower plate 36.

The upper ends of transmission lines 30 also function as sockets for triodes 53. As shown in greater detail in Fig. 15, the lower end of each triode 53 fits snugly within the outer conductor 32. A metallic flange 60, soldered to the top of inner conductor 34 supports two metal filament socket blocks 61 and 62. Block 61 is directly fastened to the flange while block 62, to which the insulated lead 36 is connected, is separated from the flange by means of an insulating strip 63. The filament prongs 69 fit into vertically disposed passages 64 which open into horizontal passages 65. Slots 66 are cut from the top of the block to the horizontal passages 65 to provide bifurcations which can be bent together so that the filament prongs can be snugly engaged.

Referring to Figs. 12 and 14, adjustable shorting disks 37 are provided for tuning each concentric line 30. Each disk is composed of two semicircular sections which are in sliding engagement with the inner and outer conductors of each line. Each disk section is attached to an outer clamping ring by means of screws 71 extending through slots 72, cut longitudinally along the lower end of each concentric line. A screw 75, threaded into lugs 76, at the ends of the clamp 70, holds the clamp in tight engagement with the outer cylinder 30 and in turn clamps the shorting disk into tight engagement with the inner cylinder 34.

Readjustment of the position of the shorting disk is accomplished by loosening screw 75, moving the clamp 70 to the new position and then retightening the screw.

The concentric filament lines 30 are equally spaced and situated near the edge of the base, forming a sort of squirrel cage enclosure. Coaxially situated within this enclosure are a pair of metal spiders 80 and 81, one held above the other by insulating supports 82 extending from the base. Each spider comprises a hub portion and a plurality of equally spaced and radially disposed T-shaped arms 84 and 85. The end portions 86 and 87 form the shorted ends of vertically disposed grid lechers 5 and plate lechers 3, respectively. Arms 84 are longer than arms 85 so that the plate lechers are disposed radially inward with respect to the grid lechers. As a result, the adjustable plate lecher shorting bars 6, to which output coil E is coupled, define a shorter circle and permit smaller diameter for said output coil; an important factor where very short waves are involved.

It will be noted that the arms 84 of the grid spiders are staggered with respect to arms 85 of the plate spiders so that the grid lechers 5 are staggered circumferentially with respect to plate lechers 3. The concentric filament lines 30 occupy the sectors between adjacent plate and grid lechers. Thus the entire assembly resembles three coaxial and symmetrical squirrel cages of different radii, with the vertical elements of one cage circumferentially and radially staggered with respect to the vertical elements of the others.

For purposes of pictorial clarity certain elements have been omitted from Fig. 12. In the actual structure an insulating plate is horizontally disposed at some plane between the lecher shorting bars 6 and spider 81, which also supports said plate. Lecher elements 3 and 5 are fastened to this plate whereby they are rigidly held in fixed position. Insulating supports, rising vertically from said plate, hold the pickup coil E at two diametrically opposite points.

Tubes 53 are "double-ended" tubes with pairs of grid terminals 90 and 91 and plate terminals 93 and 94 extending from both sides of the tube. The outwardly extending grid and plate terminals are not used, as will be evident from the circuit in Fig. 10. Corona caps 95 are, however, placed on all terminals to reduce losses.

Extending through a central opening in the base are two insulated wires 96 and 97, respectively soldered to plate spider 81 and grid spider 80, which connect the circuit to suitable sources of plate and grid potentials.

Referring particularly to Fig. 11, the pickup coil E forms part of a half-wave transmission line F. The open ends of said line are fastened in a horizontal bar 110 fastened to spaced vertical plates 112. For tuning the line, use is made of a slidable shorting bar 113, formed of two strips disposed above and below the transmission line wires and fastened together so as to be in sliding engagement with the wires. Attached at one end to the shorting bar is a rack 114 which is supported by and slides upon bar 110. Said rack is engaged by a pinion 115 mounted on a shaft 116 rotating in bearings journalled in plates 112. A manual knob 117 is used for rotating shaft 116.

Tapped into transmission line F at points that give the best impedance match, are two leads of a transmission line to the antenna. Slidable junctions 121 permit adjustment for best impedance match. A slidable stub 122 permits further tuning and matching of the system.

Figure 16:
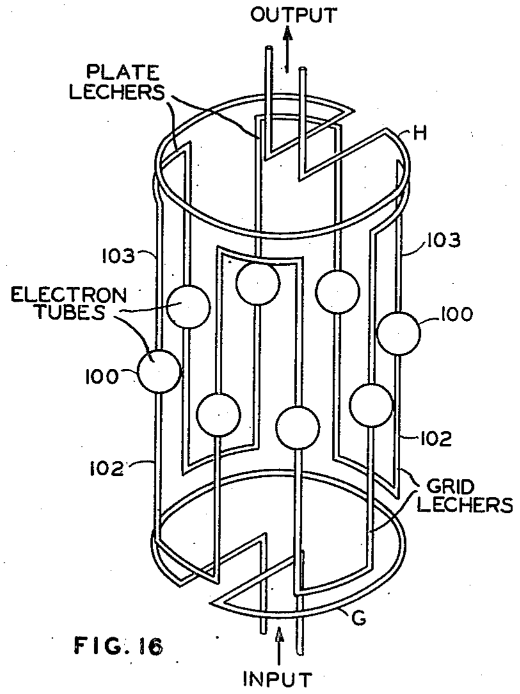
Figure 16 is a simplified isometric representation of a modification of my invention.

The principles and practices above described can also be applied to ultra high frequency amplifiers. Referring to Fig. 16, eight amplifier tubes 100 are interconnected by grid lecher lines 102, extending below the tubes, and plate lecher lines 103, extending above the tubes. Cathode tuning lines, not shown, may also be used. The circuits are the same as those described in connection with Figs. 1–10. A coil G, to which the input currents are applied, is coupled to all the grid lecher lines as shown. The output coil H is coupled to all the plate lecher lines. The lecher lines need not be tuned.

In the embodiments above described, the components have been shown as equidistantly disposed in the form of a ring. The term "ring" as used in the appended claims should not be restricted to a circular arrangement. It may mean the boundary of any space configuration, either symmetrical or nonsymmetrical, with the components not necessarily equidistant. In addition, the designation of a transmission line in terms of its wave length, e. g. a quarter wave line connected to an anode or cathode electrode, should be construed as meaning the electrical length of the line, which is determined by the geometric length, the length and capacity of the tube electrodes, and many other factors. Although the structure illustrated in Figure 12 is a structural embodiment of the circuit in Figure 10, it is obvious that all or some of the structural features of Figure 12 are equally applicable to the other circuits described herein.

There have been described several circuits and components for amplifying and oscillating systems in which any number of small tubes, having low interelectrode capacities, can be connected together in a manner which locks them all in synchronism so that maximum power is derived from each tube, whereby high power at ultra high frequencies can be obtained. A structural embodiment has also been described which is compact and symmetrical in arrangement and permits interconnecting the various components with a minimum of leads and losses.

While there have been described what are at present considered preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. An ultra high frequency network comprising a plurality of push-pull circuits each including a pair of tubes having cathode, grid and anode electrodes, tuning means for the grids of each pair, lecher lines interconnecting the plates of each pair, said lecher lines having shorting elements, said lines being physically arranged parallel to each other and forming a generally cylindrical inclosure, and a single, open-ended loop concentric with said inclosure and physically disposed adjacent all of said shorting bars so as to absorb energy therefrom, the ends of said loop being adapted to be connected to an external circuit.

2. An ultra high frequency amplifier comprising a plurality of push-pull circuits each including a pair of tubes having cathode, grid and anode electrodes, lecher lines coupling the grids of each pair, lecher lines coupling the plates of each pair, the plate lecher lines extending in one direction, the grid lecher lines extending in an opposite direction, said lecher lines having adjustable shorting elements, an input loop coupled to all the grid lecher shorting elements, and an output loop coupled to all the plate lecher shorting elements.

3. An ultra high frequency network comprising at least four electron tubes, each having at least grid, cathode, and anode electrodes, half wave lines connecting all of the grids to a point of reference potential, the first tube having its cathode connected through substantially a quarter wave line to the cathode of the second tube, the plate of said second tube being connected through a substantially quarter wave line to the plate of the third tube, the cathode of the third tube being connected through a substantially quarter wave line to the cathode of the fourth tube, and the fourth tube having its anode coupled to the anode of the first tube through transmission line means tuned to an odd multiple of a quarter wavelength.

4. An ultra high frequency network comprising a plurality of pairs of electron tubes, each having at least anode, cathode, and grid electrodes, all of said tubes being physically arranged in the form of a ring, half wave concentric lines connecting all the grids to a point of fixed reference potential, a first tube having its cathode connected through substantially a quarter wave lecher line to the cathode of a second tube, the plate of said second tube being connected through a substantially quarter wave lecher line to the plate of a third tube, the cathode of the third tube being connected through a substantially quarter wave lecher line to the cathode of a fourth tube, and so on for the grids and plates of the remaining tubes in the ring, the last tube having its plate connected through a substantially quarter wave lecher line to the plate of the first tube, and separate connections from the electrical centers of all plate lechers to a source of plate potential.

5. An ultra high frequency oscillator network comprising a plurality of circuits, some of said circuits including a pair of electron tubes, each tube having at least cathode, anode and grid electrodes, half wave concentric transmission lines in each cathode circuit, each line having inner and outer conductors, one end of each inner conductor being connected to the cathode, the corresponding ends of the outer conductors of all concentric lines being connected together, the other ends of both inner and outer conductors of all concentric lines being connected together, quarter wave lecher lines connecting the anodes of each pair of tubes, a quarter wave lecher line connecting the grid of one tube of each pair of tubes to a grid of a second pair of tubes, and a second quarter wave lecher line connecting the grid of the second tube of each pair to a grid of a third pair of tubes, and a separate connection from the electrical center of each of said plate lecher lines to a source of plate potential.

6. An ultra high frequency oscillator network comprising at least three circuits connected together in ring fashion, each of said circuits including a pair of electron tubes having at least cathode, anode, and grid electrodes, half wave concentric transmission lines in each cathode circuit, each line having inner and outer conductors, one end of each inner conductor being connected to the cathode, the corresponding ends of the outer conductors of all concentric lines being rigidly connected together, the other ends of the inner and outer conductors of all concentric lines being connected together, quarter wave lecher lines connecting the anodes of each pair of tubes, a quarter wave lecher line connecting the grid of one tube of each pair of tubes to a grid of a second pair of tubes, a second quarter wave lecher line connecting the grid of the second tube of each pair to a grid of a third pair of tubes, a separate connection from the electrical center of each of said plate lecher lines to a source of plate potential, a separate connection from the electrical center of each grid lecher line to a source of grid potential, adjustable shorting bars on all said lecher lines, and a single output loop electromagnetically coupled to the shorting bars of all the plate lecher lines, said output loop forming part of an adjustable half wave transmission line.

7. A high frequency structure comprising an electron tube having two filament prongs, and a transmission line adapted to tune said filament and support said tube, said line having a hollow inner conductor encased within a hollow outer conductor, two spaced sockets adapted to receive said prongs and situated upon a shelf secured to one end of the inner conductor, one of said sockets being connected to said inner conductor and the other socket being insulated therefrom, an insulated lead connected to the latter socket and extending through the inner conductor to one terminal of a source of current, the other terminal of said source being connected to the inner conductor.

8. A high frequency structure comprising a base member having two superposed metal plates insulated from each other, a plurality of transmission lines vertically positioned on the upper plate, each of said lines comprising a hollow inner member situated within a hollow outer member, one end of all inner and outer members being connected to the upper plate, stiff bus wires connecting the outer members near the other ends of the outer members, an electron tube having a filament and supported upon each of the other ends of said lines, one terminal of each filament being connected to the other end of each inner conductor, and the other terminal of each filament being connected to the lower base plate by means of insulated leads threaded through said inner member.

9. A high frequency structure comprising a metal base member, three sets of tuned transmission lines, the lines of each set being equidistantly spaced and arranged to form three coaxial rings of different radii; one end of each of the outer ring of lines being positioned upon and connected to the base, electron tubes supported upon and having their cathodes connected to each of the other ends of said outer ring of lines, the middle and innermost rings of lines being respectively connected to the grids and plates of said electron tubes, one of said rings of lines being lecher lines each composed of spaced parallel wires with adjustable shorting bars therebetween, and an output circuit loop in coupling relation to said shorting bars.

10. A high frequency structure comprising a base member having two superposed metal plates separated by an insulating plate, three sets of transmission lines extending perpendicularly with respect to said base, the lines of each set being equidistantly spaced and respectively arranged to form three coaxial rings of different radii, the lines of each ring being circumferentially staggered with respect to the lines of the other rings, the outer ring of lines each comprising a hollow inner member situated within an outer hollow member, one end of all inner and outer members being positioned upon and connected to the upper base plate, stiff bus wires connecting the outer members near the other ends thereof, an electron tube supported upon each of said other ends of said outer ring of lines, each tube having filament, plate, and grid electrodes, one terminal of each filament being connected to the other end of each inner conductor, the other terminal of each filament being connected to the lower base plate by means of insulated leads threaded through said inner members, means to connect a source of filament current to said upper and lower base plates, the middle and innermost rings of lines being respectively connected to the grids and plates of said electron tubes, said last mentioned rings of lines being lecher lines, each composed of spaced parallel wires with adjustable shorting bars therebetween, and an output circuit loop, of smaller diameter than said innermost ring, supported in coupling relation to the shorting bars of the plate lecher lines.

11. A transmission line array comprising two superposed coaxial metal spiders, each spider having a hub portion and a plurality of equally spaced arms radiating therefrom, the arms of one spider being staggered with respect to the arms of the other spider, a pair of spaced conductors extending vertically from each arm near the outer end thereof, each pair of conductors and the portion of the arm therebetween forming a lecher line, the stems of each arm and the hub portion of each spider providing means for connecting all said lecher lines to an external circuit, adjustable shorting bars on each lecher line of at least one of said spiders, and a coil, coaxial with said spiders, coupled to said shorting bars.

12. A transmission line array comprising two superposed coaxial metal spiders insulated from each other, each spider having a hub portion and a plurality of equally spaced T-shaped arms of equal length radiating therefrom, the arms of the upper spider being shorter than those of the lower spider, the arms of one spider being staggered with respect to the arms of the other spider, a conductor extending vertically from each end of the head of each T-arm, each head and the pair of conductors extending therefrom forming a lecher line, the stems of each T-arm and the hub portion of each spider providing means for connecting all said lecher lines to an external circuit, adjustable shorting bars on each lecher line of at least the upper spider, and a coil, smaller in diameter than the upper spider and coaxial therewith, coupled to said shorting bars.

13. An ultra high frequency network comprising a plurality of transmission lines, each comprising a pair of elements having a shorting bar therebetween, all of said elements being physically disposed in parallel with each other and symmetrically disposed so as to form a generally cylindrical inclosure, and a single, open-ended loop concentric with said inclosure and physically disposed adjacent all of said shorting bars so as to absorb energy therefrom, the ends of said loop adapted to be connected to an external circuit.

MELVIN D. BALLER.

REFERENCES CITED

The following references are of record in the file of this patent:

UNITED STATES PATENTS

| Number | Name | Date |
|---|---|---|
| 1,929,874 | Salzberg | Oct. 10, 1933 |
| 1,934,523 | Brown | Nov. 7, 1933 |
| 1,941,542 | Dow | Jan. 2, 1934 |
| 1,983,848 | Gill | Dec. 11, 1934 |
| 2,007,662 | Prinz | July 9, 1935 |
| 2,052,888 | Lindenblad | Sept. 1, 1936 |
| 2,066,674 | Dunmore | Jan. 5, 1937 |
| 2,067,679 | Paddle | Jan. 12, 1937 |
| 2,081,425 | Fay | May 25, 1937 |
| 2,086,905 | Evans | July 13, 1937 |
| 2,109,843 | Kassner | Mar. 1, 1938 |
| 2,113,340 | Evans | Apr. 5, 1938 |
| 2,175,710 | Usselman | Oct. 10, 1939 |
| 2,177,272 | Zottu | Oct. 24, 1939 |
| 2,203,806 | Wolf | June 11, 1940 |
| 2,205,852 | Hollman | June 25, 1940 |
| 2,227,604 | Smith | Jan. 7, 1941 |
| 2,252,370 | Goldstine | Aug. 12, 1941 |
| 2,287,845 | Varian | June 30, 1942 |
| 2,292,254 | Van Beuren | Aug. 4, 1942 |
| 2,298,075 | Tinus | Oct. 6, 1942 |
| 2,373,233 | Dow et al. | Apr. 10, 1945 |
| 2,406,364 | Friis | Aug. 27, 1946 |
| 2,426,236 | Page et al. | Aug. 26, 1947 |
| 2,431,179 | Kentner | Nov. 18, 1947 |